March 30, 1965     S. BATESON     3,175,634
LOW TRACTION VEHICLE PROPULSION DEVICE
Filed Aug. 3, 1961     2 Sheets-Sheet 1
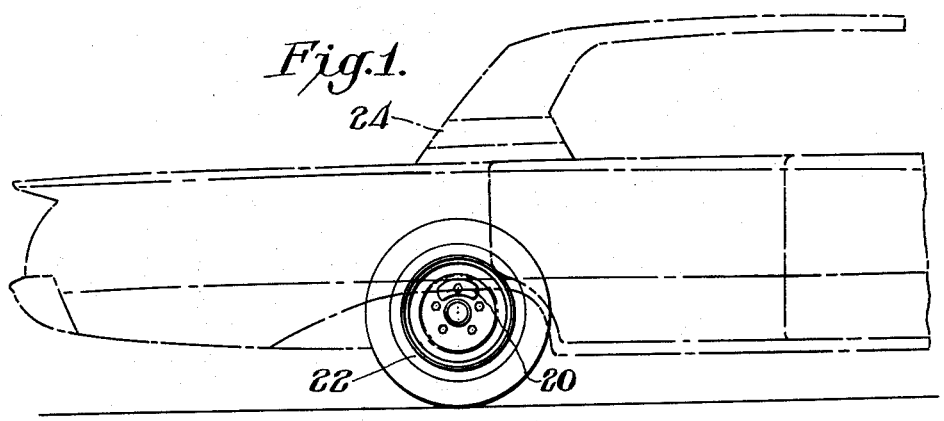
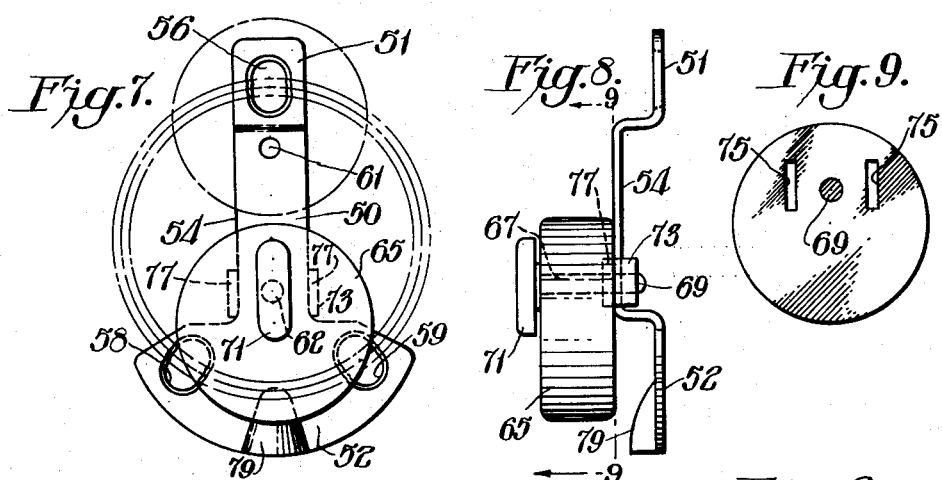
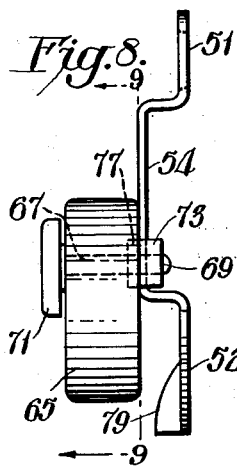
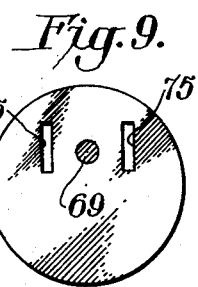
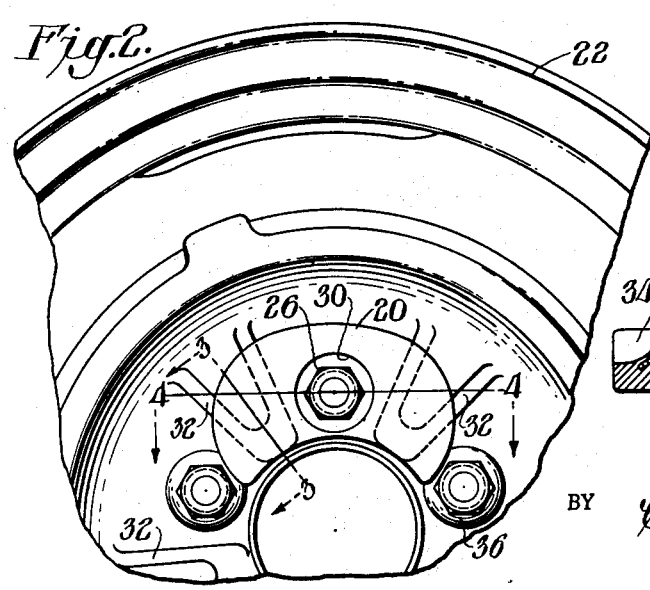
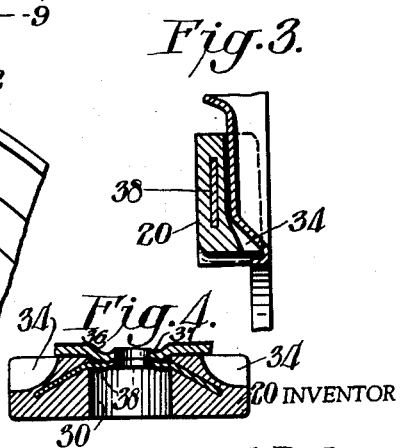
INVENTOR
Samuel Bateson
BY Connolly and Hutz
ATTORNEYS

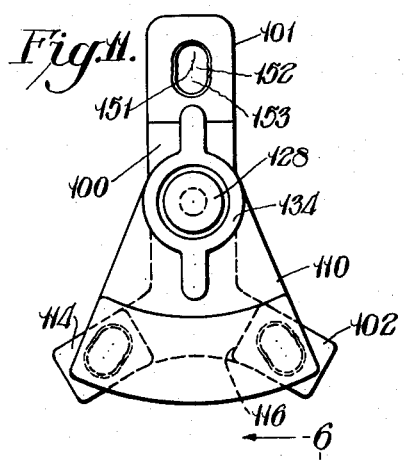
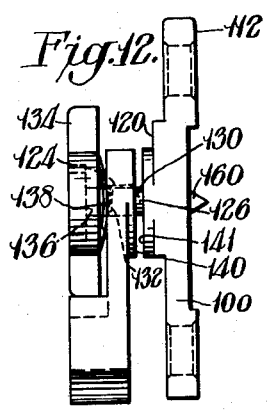
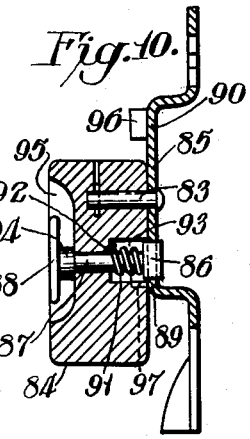
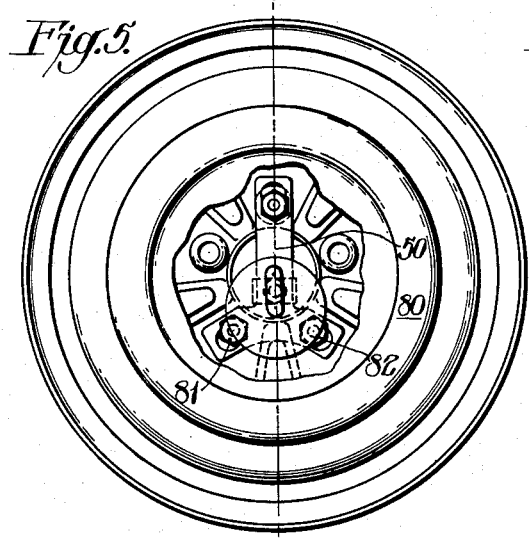
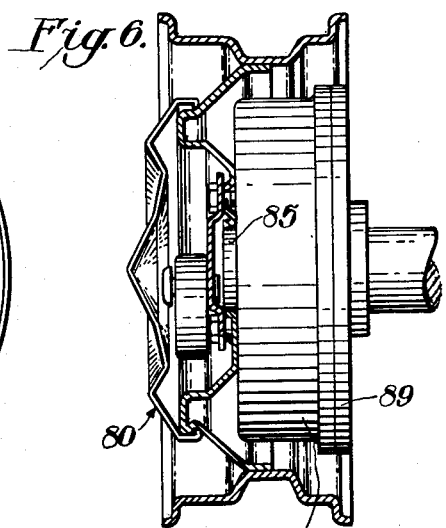
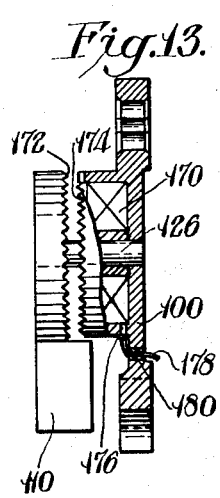
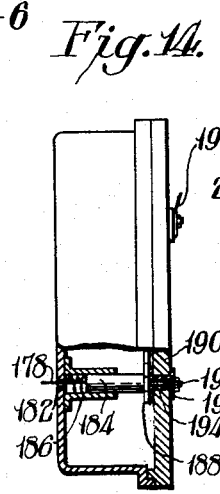
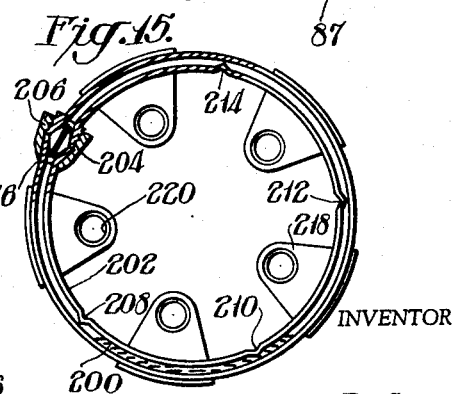

United States Patent Office 3,175,634
Patented Mar. 30, 1965

3,175,634
LOW TRACTION VEHICLE PROPULSION DEVICE
Samuel Bateson, Delaire, Del.
(6 Park Lane, Wilmington 3, Del.)
Filed Aug. 3, 1961, Ser. No. 129,056
9 Claims. (Cl. 180—7)

The present invention relates to the propulsion of wheeled vehicles such as automobiles, particularly when the wheels have insufficient traction to properly propel the vehicle in the normal manner.

Among the objects of the present invention is the provision of a novel method and apparatus for providing the above propulsion when the vehicle is stuck in snow, ice, mud or sand and will not move satisfactorily when operated in the regular manner.

The above as well as additional objects of the present invenion will be more readily understood from a consideration of the following exemplifications, reference being made to the accompanying drawings wherein:

FIG. 1 is a side view of an automobile wheel equipped with a low traction vehicle propulsion unit in accordance with the present invention, adjacent portions of the automobile being shown in phantom;

FIG. 2 is an enlarged detail view of the low traction vehicle propulsion unit of FIG. 1;

FIGS. 3 and 4 are sectional views of the unit of FIG. 2 taken along the lines 3—3 and 4—4, respectively;

FIG. 5 is a view of an automobile wheel fitted with a modified form of low traction vehicle propulsion unit representative of the present invention;

FIG. 6 is a sectional view of the construction of FIG. 5 taken along line 6—6;

FIG. 7 is a view similar to FIG. 5 showing the low traction vehicle propulsion unit itself;

FIG. 8 is a side view of the unit of FIG. 7;

FIG. 9 is a sectional view of the construction of FIG. 8 taken along the line 9—9;

FIG. 10 is a sectional view similar to FIG. 8 of a further construction according to the present invention;

FIGS. 11 and 12 are front and side views similar to FIGS. 7 and 8 of a still further embodiment of low traction vehicle propulsion unit of the present invention;

FIG. 13 is a side view partly in section of yet another construction embodied in the present invention;

FIG. 14 is a side view partly in section of the wheel and related parts of an automobile equipped with the unit of FIG. 12; and FIG. 15 is a sectional view of a somewhat different type of low traction vehicle propulsion unit within the scope of the present invention.

According to the present invention, an automobile that has driving wheels with insufficient traction is propelled under low traction conditions by applying to at least one of the driving wheels with insufficient traction a weight that unbalances the wheel sufficiently to cause the wheel to be propelled in a vibratory manner when it is rotated at a sufficiently high speed, then rotating the wheel at said high speed.

The term "automobile" as used in the present invention refers to motor vehicles of both the passenger and truck type, whether they be operated by gasoline engines, diesel engines, electric motors, gas turbines, or any other source of power.

The weight used for unbalancing the driving wheel pursuant to the present invention, can have mass elements weighing at least about two pounds with adjustable securing means for fastening these elements to at least one lug of an automobile wheel sufficiently securely to withstand the vibration of the wheel, yet provide for adjustment of the mass elements into and out of vibration-inducing position.

The mass elements can be in the form of an integral weight having an aperture through which the threaded shank of a lug fastener fits, the wall around the aperture being less than about ⅜ inch thick.

The mass elements can also include a fixed member for permanent securing to the wheel lugs, and a shiftable member connected for mounting on the fixed member in two different positions, one of which positions is an unbalanced position, and the other a balanced one.

The fixed member itself can be unbalanced and can be balanced by the shiftable member when the shiftable member is in balanced position.

In an extremely simple embodiment of the present invention there can be secured to an automobile wheel a lead-containing block weighing about 2½ pounds and about ¾ to 1 inch thick, the block having a recess on one face large enough to receive a wheel lug, and at the bottom of the recess a hard metal insert less than ⅜ inch thick and shaped to provide an anchorage for securing the block under the lug when in wheel-fastening position.

To simplify the mounting of the unbalanced mass elements, they can be adjustably held on a mounting member which in turn is more or less permanently mounted on the wheel. Where the lugs that hold the wheel in place are arranged in pentagonal form, that is at the vertices of a regular pentagon, such a mounting member can have two opposing arms, one narrow, relatively light in weight, and provided with a mounting aperture near its extremity, and the other being wider, weighing about a pound more than the lighter arm and having two mounting apertures arranged at adjacent locations of a pentagon corresponding to the lug arrangement. The mass element can then have a weight attachable at different locations on the mounting member in one of which locations it balances the excess weight of the wide arm of the mounting member and in another location it emphasizes the excess weight of this wide arm.

Turning now to the drawings, the low traction vehicle propulsion unit of the present invention as shown in FIG. 1, is merely in the form of a simple weight 20 fastened to a rear wheel 22 of an automobile 24. As more clearly indicated in FIG. 2, the weight 20 is secured to the wheel by means of one of the wheel lug nuts or bolts 26, so that no separate securing device is needed although one can be used if desired.

It has been discovered that a weight of only about 1½ to 2 pounds secured in this manner to one real wheel of an automobile weighing as much as 4,000 pounds, will cause that wheel to vibrate and propel the entire automobile forwardly even though this wheel is stuck in sand, snow, ice or mud to such a degree that any kind of rotation of this wheel will merely cause it to spin without moving the automobile when the wheel does not have the weight attached. For automobiles weighing appreciably less than 4,000 pounds the weight can be reduced to even less than 1½ pounds.

The weight 20 can be a simple relatively thick casting provided with a socket 30 into which the lug nut or bolt can be received so that the thickness of the weight member at the point where it separates the lug nut or bolt head from the wheel is less than about ⅜ of an inch. In conventional wheel constructions the shanks of the lug studs or lug bolts (where bolts are used) are sufficiently oversize in length to allow for this extra ⅜ inch thickness.

The socket 30 should also be sufficiently large to admit the lug-gripping end of any wrench or other tool that can be used to remove or secure the lugs.

The weight 20 can be made of any relatively dense metal such as steel or lead or alloys thereof. A weight made essentially of lead is extremely compact whereas a steel weight would have almost twice the volume to reach a mass equal to that of a lead weight.

Some automobile wheels have deformations such as ribs 32 adjacent to the lugs and shaped so as to occupy some of the space near the lugs. It is therefore desirable to provide the weight 20 with grooves, as indicated at 34, to permit the weight to be properly seated close to the lug-receiving surface of the wheel. For a weight that is intended to fit different types of wheels the grooves 34 may be modified in shape so as to avoid the rib or other configurations the various wheels have.

The lug-engaging surface of the wheel is generally shaped to form a slight mound 36 with the edge of the lug-receiving opening in the form of a cone segment 37 so that there is a conical seal between the wheel and the lug which has a conical mating surface. The weight 20 is desirably shaped so as to fit against the mound as well as the conical edge of the wheel although it is sufficient to have the weight fit either the mound or the conical edge by itself.

When the weight is made of relatively soft metal such as lead, it is helpful to have a hard insert, as indicated at 38 in FIGS. 3 and 4, so that the insert provides the securing surface both for the lug and the wheel. The insert 38 can also extend through the surrounding portions of the weight to strengthen it.

The weight 20 can be arranged so that it is fairly close to the center of rotation of the wheel since in such a location the wheel is usually hollowed out and a weight as much as 1¼ inches or more in thickness can be received there without interfering with the mounting of a hub cap or a wheel cover. However, the weight can also be extended out farther from the center of rotation and can in fact be somewhat diminished in mass when so extended. Also the weight can be diminished in the width shown in FIG. 2, so that it has some clearance from the lugs adjacent to the one on which it is mounted. Different wheels have different distances between adjacent lugs, and for greater versatility a narrower weight dimension would be more desirable.

Alternatively the weight can be arranged so that it is secured by two or even three adjacent lugs.

A weight of the above kind, although very effective for propelling an automobile under low traction conditions, does not interfere with normal driving at moderate speeds. Thus in one embodiment of the invention a 1956-model Buick automobile weighing approximately 4,000 pounds, propelled itself out of an otherwise hopelessly stuck condition in mud with the help of a 2½ pound weight such as that shown in FIG. 2, and then without removing the weight, was driven on smooth roads at speeds as high as 50 miles per hour without showing significant variation.

FIGS. 5 through 9 show an embodiment of the invention in which it is unnecessary to remove the weight when the low traction propulsion is no longer needed. This modification has a low traction unit formed of several different components. A bracket body 50 is one of the components and it has two opposing arms 51 and 52 connected by a raised strap portion 54. Arm 51 is provided with an opening 56 by which it can be secured under a wheel lug. The opposing arm 52 has two such openings 58, 59 by which it can be secured under two adjacent lugs on the opposite side of the wheel.

The strap 54 has a set of apertures 61, 62 by which a mass 65 is secured to the bracket. As shown, the mass 65 is in the general shape of a cylinder having a passageway 67 through which penetrates the shank 69 of a bolt 71. Bolt 71 can be threadedly received in the strap 54, or it can merely penetrate through apertures 61, 62 that are not threaded, and secured by a threaded clip 73 on the side of the strap opposite that which is contacted by the weight 65.

Where the strap 54 is not sufficiently long to allow the desired range of travel for weight 65, this range can be extended as by locating the passageway 67 eccentrically in the weight. In this way the weight at the position as shown in full lines in FIG. 7, is substantially displaced from the axial alignment with the wheel-rotating axis in a direction toward the wide bracket arm 52, and in the position shown by the dot-dash lines in FIG. 7 the weight is rotated 180° around its passageway 67 and is also secured in aperture 61 so that the weight is far enough opposed to the wide bracket arm 52 that it counterbalances that arm. The wide arm 52 of the bracket is made heavier than the opposing arm 51 by about ½ to 1 pound and the mass of weight 65 adjusted so that in the dot-dash position it effectively counterbalances this extra weight. On the other hand, in the full line position the weight 65 adds to the unbalancing effect of the wide arm 52 to give an amount of total unbalance sufficient to bring about the desired vibration.

Where the weight 65 is to be rotated around its aperture 67, it is helpful to provide positive alignment as by forming depressions 75 on its inner face on each side of the aperture 67, and extending the clip 73 so that it has angularly formed wings 77 that are received in the depressions 75. Adjustment of the weight can then be readily effected by unscrewing the bolt or the clip, withdrawing the bolt from aperture 62, for example, inserting the bolt still carrying the weight through aperture 61, rotating the weight to approximately the desired orientation, engaging the clip on the end of the bolt, and then screwing the bolt up tight, making sure to cause the wings of the clip to sit in the depressions 75.

A flute 79 can be provided in the wide arm 52 to allow this arm to fit over ribs such as indicated at 32 in FIG. 2. If the wide arm is sufficiently heavy as compared to the lighter arm, the mass of weight 65 can be reduced down to about 1½ pounds or thereabouts. On the other hand, a smaller difference in weight between the bracket arms would call for a larger mass in weight 65. With such less unbalanced bracket and heavier weight 65, it is not necessary to rotate the weight 65 between the two mounting positions in apertures 61, 62. Instead, the eccentric position shown in full lines in FIG. 7 can be retained when it is shifted to the balancing position.

The smaller mass needed for weight 65 in the construction of FIGS. 5 through 9, is helpful since it enables the fitting of the entire assembly underneath a hub cap such as that indicated at 80 in FIG. 6, and still keeps the weight from being interfered with by the projecting lugs, such as those numbered 81 and 82 in FIG. 5. If desired, however the weight 65 can be notched out to leave room for these lugs and the weight made somewhat thicker in its lowest portions, as seen in these figures.

Instead of having separate apertures 61, 62 in the strap portion 54, the strap may have a continuous slot extending between the two desired positions of the weight. The use of a slot will make it unnecessary to completely detach the clip 73 from the bolt 71 when adjustment is made.

The slots 56, 58 and 59 in bracket 50 are shown as elongated so as to fit on wheels having different lug positions. For most standard size automobiles five lugs are used, the lugs being positioned symmetrically around the wheel axis on the vertices of a regular pentagon. The circle defined by the lug can vary in diameter with different wheels and the threaded shanks by which the lugs are held can also vary in thickness. The slots 56, 58, 59 can accordingly be made to fit several lug circles so that a single bracket will operate several different types of wheels. Some wheels have only four lugs and for use with such wheels the heavy arm 52 of the bracket can have a single circular opening or elongated slot directly opposite slot 56. Also a bracket can have its arm 52 provided with three slots, two such as those shown at 58 and 59 and a third corresponding to one needed for four-lug wheels. If the flute 79 interferes with the additional opening in the slot, the arm 52 can have its central portion made in the form of a plane located between the levels of strap 54 and the remainder of arm 52, and a separate spacer can be fitted under this plane-forming portion to be used with four-lug wheels. The plane itself is so located that it is not interfered with, such as by ribs 32.

Instead of depending upon sliding the movable weight, with or without rotation, from one position to the other, this weight can be pivoted to the strap. FIG. 10 shows such a construction in which a bolt 83 with an enlarged head pivotally secures the weight 84 against the bracket strap 85. The bolt can be locked in place in the weight, or it can be cast in the weight when the weight is manufactured. A locking plunger 86 slidably held by the weight on a shank 87 having a two-winged head 88, holds the weight in position by engaging in either of two apertures 89, 90, in the strap. A spring 91 fitted around shank 87 and compressed between the plunger 86 and the floor 92 of a recess 93 in the weight, holds the plunger extended in locking position, and a shoulder 94 on shank 87 determines the limit of the locking travel. A recess 95 can be provided in the face of the weight adjacent the head 88 so that the head need not protrude beyond the weight, and at the same time the head can be readily engaged and lifted by inserting one's fingers in the recess.

To help in locking the weight in place, the strap can be provided with tabs 96, 97 which act as stops limiting the rotation of the weight 84. Accordingly, when the weight is to be shifted in position it is only necessary to pull out head 88, rotate the weight from the position shown in FIG. 10, for example, away from the tab 97 until it engages tab 96. At this point locking plunger 86 is in line with locking opening 90, and the head 88 can then merely be permitted to return to its locking position to complete the adjustment. A similar head-lifting, rotation in the opposite direction, and head-lowering, will complete the reverse adjustment.

The construction of FIGS. 11 and 12 includes a bracket 100 somewhat similar to the above bracket 50, with a freely rotatable weight 110 journaled to the bracket so that the weight rotates around the wheel axis when the bracket is secured to the wheel. The bracket is here shown as a casting having a single slotted arm 101 with an opposing doubly slotted arm 102. A boss 112 around the bottom of the slot in arm 101 and similar bosses 114, 116 in the opposing arm, project somewhat from the inner face of the remainder of the bracket so as to better engage the lug-connecting mounds 36 while the intermediate portion of the bracket clears the turned-in lip 85 generally found on wheels.

The weight 110 has a journal opening 124 by which it is pivoted on a pin 126 secured to the bracket as by welding or brazing. This pin has an enlarged head 128 and its shank 130 is threaded for a short distance 132 below and spaced from the head. A wing nut 134 is received over the shank 130 adjacent the head 128, and is internally threaded to mate with the threaded shank portion 132. The thread on portion 132 tapers down to an unthreaded shank portion 136 where the wing nut is normally held as by an arched spring washer 138. Another such spring washer can be inserted on shank 130 between weight 110 and bracket 100, although this is not essential. However, the weight and the bracket are provided with flat engagement faces 140, 141 so that they can be frictionally locked together by threading the nut 134 down on the shank.

The construction of FIGS. 11 and 12 is operated by mounting on the wheel with its bracket 100 secured in place, as described in connection with bracket 50. With the parts in the position shown in FIG. 12, the weight will hang free while the wheel turns, and thus remain in a more or less constant downward position without causing any vibration of the wheel. In such arrangement the spring 138 does not supply sufficient friction to cause the weight to rotate. When vibration is desired the wing nut is pushed into engagement with the threaded shank section 132 and then threaded in until it clamps the weight against the bracket. The weight will then rotate with the wheel. The same propelling effect is thus obtained under low traction conditions as with the other constructions, and the weight is not readily loosened by the vibration.

It is desirable to have the bracket 100 more carefully balanced than bracket 50 since there is no counterbalancing for bracket 100. It is accordingly helpful, where mounting slots are used in bracket 100, for the slots to be accurately shaped and of a self-centering type. Most widely used wheels have either (1) lug circles 4½ inches in diameter with threaded lug-engaging shanks ½ inch in diameter, or (2) lug circles 4¾ inches in diameter with threaded lug-engaging shanks 7/16 inch in diameter, or (3) lug circles 5 inches in diameter with threaded lug-engaging shanks ½ inch in diameter. The slots can accordingly be made in three distinct portions represented by 151, 152 and 153. Portions 151 and 153 correspond to arcs of circles each having a ½ inch diameter spaced ¼ inch apart. Portion 152 represents a portion of a circle having a diameter 7/16 of an inch centered midway between the ½ inch circles. With such an arrangemnet the bracket will fit on any of the above wheels only when the bracket is accurately aligned. A similar arrangement can be used for the bracket 50 if desired.

An alternative or additional centering device for the bracket 100 can be in the form of a conical projection 160 projecting from the wheel-engaging face of the bracket and in the general shape of a lathe center so that it is received by drilled centers usually provided in the ends of the wheel axles.

FIGS. 13 and 14 show a vibrating construction which can be remotely controlled as by a switch on the dashboard of the automobile. The wheel mounted unit of this construction is similar to that of FIG. 12, but in FIG. 13 the bracket 100 is provided with an electromagnet coil 170 around pivot pin 126, and no wing nut is used. Also the mating surfaces of the weight 110 and the bracket are serrated or toothed, as indicated at 172 and 174, with the serrations or teeth shaped to interlock so as to help clamp the weight against the bracket when the electromagnet is energized. Although it is not essential and accordingly not illustrated in FIG. 13, a spring such as the arched washer of FIG. 12 can be used to make sure that the teeth do not inadvertently engage each other when no locking is wanted.

The winding 170 can have one terminal grounded against the bracket with the other terminal leading to a plug-in connector 176. A wire 178 penetrating through an insulated aperture 180 in the bracket is plugged into the connector and also extends through a suitable aperture in the wheel and into the brake drum.

FIG. 14 shows the brake drum with the wire 178 penetrating through insulated aperture 182 and connected to a brush 184 suitably mounted in a brush holder 186. A contact ring 188 is secured to the brake flange 190, which forms a non-rotating portion of the automobile, as by integrally formed studs 192 distributed around the ring and threadedly held as by spool-shaped insulator assemblies 194 and nuts 196. A lead 198 from one of the studs is then run to a switch on the dashboard or the like, so that the electromagnet can be energized when desired. Upon energization the weight is pulled over toward the bracket and locked to it for vibrational operation. De-energization of the electromagnet releases the weight and permits it to then hang free while the wheel rotates. Where the magnetic force is of sufficient magnitude the serrations or teeth 172, 174 can be omitted. To avoid inadvertent operation, the lead 178 can be grounded when the traction device is not to be used.

FIG. 15 shows a form of the invention which is entirely automatic in operation. Here the unbalancing weight is in the form of a body of liquid 200 held in a circular or toroidal chamber 202. The chamber is in the form of a length of metal tubing or the like, bent around so that the ends of the length are in mouth-to-mouth engagement. The mouths are sealed against each other by suitably threaded clamp elements 204, and a sealing insert 206 can be held between the mouths to help provide a liquid-tight interconnection.

The chamber is divided into a plurality of sections by the insert 206 and a set of constrictions 208, 210, 212 and 214. A passageway 216 through the insert 206 also provides a constricted interconnection between the adjacent portions of the chamber. All the constrictions are such as to allow the liquid 200 to flow through at a limited rate. The unit is mounted on a wheel as by welding or otherwise securing a set of brackets 218 to peripherally spaced portions of the chamber, each bracket having a mounting opening 220 that is engaged under a wheel lug.

The apparatus of FIG. 15 is filled with sufficient liquid so that when it collects at the bottom of the chamber, as illustrated for example, it will provide the amount of unbalance needed to cause the desired vibration when the wheel is rotated. As rotation continues, centrifugal force will cause the liquid to work its way through the constrictions until it is uniformly distributed throughout the entire chamber. Accordingly after running for a short period of time, approximately one minute or less, there will be no residual unbalance of the wheel. Upon stopping of the wheel rotation, the liquid will gradually work its way down to the lowest part of the chamber and the wheel will then become unbalanced. Again about a minute or so might be needed to permit all of the liquid to settle down. Any unbalancing effect of the clamping element 204, as well as of the insert 206, can be offset by suitably weighting the opposing bracket 218.

The apparatus of FIG. 15 can be made fairly small for use with dense liquids like mercury. On the other hand, an apparatus of this type can be incorporated within the tire, as by forming the chamber of plastic or rubber tubing or the like, cemented, vulcanized, or otherwise secured to the internal surface of the tire. The larger amount of space within the tire as well as the larger diameter provided for the chamber therein, enables the use of less expensive unbalancing liquids such as water. Any evaporation or other loss of the liquid can be taken care of by running a special line from the chamber to the wheel where an additional valve can be mounted for admitting more liquid.

The unbalanced weight arangement of the present invention can also be provided in other forms, as by mounting them on the internal portion of the wheel, or interiorly of the brake drum, or even within the rear axle housing. Also the various parts of the apparatus can be held together in other ways. For instance the wing nut 134 can be replaced by a lug nut so that it can be operated by the same lug wrench that fits the wheel-holding lugs. The weight clamping lug nut is preferably of the self-locking type, when the threaded shank portion 132 is extended to the outer end of the shank, so that this lug, which remains threaded to the shank at all times, does not move along the thread unless the lug is turned by the wrench. An effective form of self-locking lug is made of spring metal with a small peripheral gap cut out of its entire height and sprung into a tight-fitting split collar. Such a lug holds itself securely in place on the shank and can be tightened and loosened many times without wearing out its spring-gripping action. To help start such a springy lug onto the shank thread, the starting end of the thread on the shank or in the lug can be tapered. For longest life the shank thread should be hardened so as not to be readily worn down by the movements of the spring lug.

The construction of FIG. 15 can be provided with clamps that will operate when desired to completely seal one or more of the chamber sections. This arrangement can be used to lock the liquid in unbalanced condition, so that the wheel can be driven for sustained periods through snow, mud or the like.

Vibration of only one rear wheel is enough to propel an automobile even though both of its rear wheels are stuck and have no traction. Better propulsion is obtained, however, where vibration of both rear wheels is carried out. There appears to be no limit on the type of automobile which can be propelled in accordance with the present invention, from the smallest compact passenger vehicles to the heaviest trucks. Where an automobile has tandem mounted wheels, the vibration can be carried out on either of the tandem portions of these wheels. Both tandem portions can be vibrated, and since these tandem portions are generally held in such a manner that each is separately resiliently mounted, the vibrations of the different portions need not be synchronized. No synchronism is needed when vibrating the right and left wheels on the same axle of an automobile regardless of the size of the automobile and regardless of the number of rear axles. As soon as both wheels on one axle are vibrated, they pull themselves into synchronism, apparently by changing their speeds slightly, so that the axle vibrates as a unit with the wheels. When this condition is reached the wheels rotate at identical speeds, each in synchronism with the axle vibration.

Obviously many other modifications and variations of the present invention are possible in the light of the above teachings. It is, therefore, to be understood that within the scope of the appended claims the invention may be practiced otherwise than as specifically described.

What is claimed:

1. A wheel vibrating device for attachment to the lugs of an automobile wheel to vibratingly propel it when it has insufficient traction, said device having a vibration-inducing member weighing at least about 2 pounds and a mounting member having apertures each about as wide as a lug for fastening in non-adjustable position to an automobile wheel sufficiently securely to withstand vibration of the wheel, the vibration-inducing member and the mounting member having coacting securing means that holds them together in only two dispositions each non-adjustable, one of the dispositions providing the maximum degree of vibration-inducing unbalance, and the other providing a balanced arrangement that does not induce vibration.

2. The combination of claim 1 in which the mounting member is itself unbalanced, and the vibration-inducing member is shiftable between two positions in one of which it balances the mounting member and in the other of which it adds to its unbalance.

3. A lead-containing block weighing about 2½ pounds and about ¾ to 1 inch thick, the block having a central recess on one face large enough to receive a wheel lug, and at the bottom of the recess a hard metal insert less than ⅜ inch thick with a circular hole and shaped to provide an anchorage for securing the block under the head of a lug fastener when in wheel-fastening position.

4. A mounting member for fastening to an automobile wheel by a pentagonally arranged group of lugs, said member having two opposing arms, one narrow, relatively light in weight, and provided with a mounting aperture near its extremity, and the other being wider, weighing about one-half pound to one pound more than the lighter arm and having two mounting apertures arranged at adjacent vertices of a pentagon corresponding to the lug arrangement.

5. The combination of a mounting member according to claim 4 and a weight adjustably held on the mounting member for shifting between a position where it balances the excess weight of the wide arm, and another position where it emphasizes the unbalance of the arms.

6. The combination of claim 1 in which the securing means include journal structure connected to be concentric with the wheel on which the members are mounted to hold the vibration-inducing member so that it hangs down and journals freely when the wheel rotates, and adjustable clamp mechanism connected to controllably secure the vibration-inducing member against the wheel so that it rotates with the wheel.

7. A wheel vibrating device for attachment to an automobile wheel to vibratingly propel it when it has insufficient traction, said device including a generally toroidal chamber, a body of liquid occupying only a small portion of the chamber, and mounting means for holding the chamber on an automobile wheel, said chamber having peripherally spaced portions interconnected through restricted passageways for causing the body of liquid to unbalance the wheel by slowly collecting in the low chamber portion when the wheel does not rotate, and for causing the unbalanced wheel to slowly become balanced when the wheel rotates and distributes the liquid throughout the chamber.

8. A wheel-vibrating device for attachment by lug fastener elements to an automobile wheel that is held in place by a set of said elements, said device having a vibration-inducing member weighing at least about two pounds and a mounting spider with a central web and several oppositely directed arms each having at its periphery an aperture about as wide as the shanks of the lug fastener element, the apertures having walls less than about 3/8 inch thick for engagement by the heads of the lug fastener elements and shaped for clamping directly against the face of the automobile wheel, the web of the spider having securing means for holding the vibration-inducing member both in vibration-inducing and non-vibration inducing disposition.

9. The combination of claim 8 in which the securing means is a pivot pin and the vibration-inducing member is pivotally received on the pin.

References Cited by the Examiner
UNITED STATES PATENTS

| | | | |
|---|---|---|---|
| 2,639,777 | 5/53 | Dull | 180—1 |
| 2,687,918 | 8/54 | Bell et al. | 301—5 |
| 2,699,362 | 1/55 | Sawyer et al. | 301—41 |
| 2,710,777 | 6/55 | Poche | 180—7 X |
| 2,746,768 | 5/56 | Bowser | 280—150 |
| 2,927,821 | 3/60 | Palmer | 301—5 |
| 3,006,690 | 10/61 | Pierce | 301—5 |
| 3,017,223 | 1/62 | Morrill | 301—5 |
| 3,017,224 | 1/62 | Palmer | 301—5 |
| 3,046,058 | 7/62 | Hamer | 301—5 |

FOREIGN PATENTS 907,855   3/54   Germany.

A. HARRY LEVY, *Primary Examiner.*

PHILIP ARNOLD, LEO FRIAGLIA, *Examiners.*